(12) United States Patent
Seguin et al.

(10) Patent No.: US 9,038,069 B2
(45) Date of Patent: *May 19, 2015

(54) MANAGEMENT OF COMPUTER SYSTEMS BY USING A HIERARCHY OF AUTONOMIC MANAGEMENT ELEMENTS

(71) Applicant: EMBOTICS CORPORATION, Ottawa (CA)

(72) Inventors: Jean-Marc L. Seguin, Stittsville (CA); Jay M. Litkey, Stittsville (CA)

(73) Assignee: EMBOTICS CORPORATION, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,179

(22) Filed: Sep. 4, 2014

(65) Prior Publication Data

US 2014/0379950 A1 Dec. 25, 2014

Related U.S. Application Data

(63) Continuation of application No. 13/448,084, filed on Apr. 16, 2012, now Pat. No. 8,850,431, which is a continuation of application No. 12/118,697, filed on May 10, 2008, now Pat. No. 8,161,478.

(60) Provisional application No. 60/917,095, filed on May 10, 2007.

(51) Int. Cl.
*G06F 9/455* (2006.01)
*G06F 13/362* (2006.01)

(52) U.S. Cl.
CPC .......... *G06F 13/362* (2013.01); *G06F 9/45533* (2013.01); *G06F 9/45558* (2013.01); *G06F 2009/45566* (2013.01)

(58) Field of Classification Search
None
See application file for complete search history.

(56) References Cited

U.S. PATENT DOCUMENTS 7,685,147 B2 * 3/2010 D'Alo et al. .................. 709/220
2005/0251806 A1 11/2005 Auslander et al.

OTHER PUBLICATIONS

Tony White, Dan Calvert, Jay Litkey, "Design of an Autonomic Element for Server Management," ICAC, pp. 147-158, Second International Conference on Autonomic Computing (ICAC'05), Jun. 2005.
Tony White, Jay Litkey, "Autonomic Control for Servers: Why a Management Plane Makes Sense" published online by Embotics corporation at http://www.embotics.com in May 2006.
Jarrett, Michael "An Architecture for Self-Protecting Autonomic Systems" Aug. 29, 2003.

* cited by examiner

*Primary Examiner* — Gregory A Kessler
(74) *Attorney, Agent, or Firm* — Victoria Donnelly; IP-MEX Inc.

(57) ABSTRACT

A method and system for managing a computing system by using a hierarchy of autonomic management elements are described. The autonomic management elements operate in a master-slave mode and negotiate a division of management responsibilities regarding various components of the computing system.

24 Claims, 9 Drawing Sheets

MANAGEMENT OF COMPUTER SYSTEMS BY USING A HIERARCHY OF AUTONOMIC MANAGEMENT ELEMENTS

RELATED APPLICATIONS

This application is a Continuation of the U.S. application Ser. No. 13/448,084 filed on Apr. 16, 2012, which is a continuation of U.S. application Ser. No. 12/118,697 filed on May 10, 2008, which has now issued as a U.S. Pat. No. 8,161,478 on Apr. 17, 2012, which claims benefit from the U.S. provisional application Ser. No. 60/917,095 filed May 10, 2007 entitled "Management of Computer System Using a Hierarchy of Autonomic Management Systems", entire contents of all patent applications and the issued patent being incorporated herein by reference.

FIELD OF THE INVENTION

The present invention relates to autonomic computing, and in particular, to the management of computer systems by using a hierarchy of autonomic management elements.

BACKGROUND OF THE INVENTION

The increasing complexity and diversity of current computer systems have made the existing computer infrastructure difficult to manage and insecure. This has led researchers to consider an alternative approach for computer systems design, which is based on principles used by biological systems to deal with complexity, heterogeneity and uncertainty, the approach being referred to as autonomic computing. Autonomic computing is a new paradigm in computing systems design for computer systems that are self-configuring, i.e. automatically configuring components, self-healing, i.e. automatically discovering and correcting faults, self-optimizing, i.e. automatically monitoring and controlling resources to ensure the optimal functioning with respect to the defined requirements, and self-protecting, i.e. providing proactive identification and protection from arbitrary attacks. Autonomic computing solves the management problem of today's complex computing systems by embedding the management of such systems inside the systems themselves, freeing users from potentially overwhelming details.

An Embot™, one form of an autonomic management element for computer systems (and other systems), has been developed by the applicant as described in the articles by Tony White et al. entitled "Design of an Autonomic Element for Server Management" and "Autonomic Control for Servers: Why Management Plane Makes Sense", both of which are incorporated herein by reference. In the present patent application the terms "Embot™" and "autonomic management element" will be considered as synonyms and used interchangeably throughout the patent application.

Normally, the autonomic management element is designed to manage everything in a computer system from the physical hardware through the operating system (OS) up to and including software applications. So far, an existing development of autonomic management elements has been limited to situations where only one autonomic management element has been required.

However, in view of the ever growing complexity of computer systems, there are numerous situations where a plurality of autonomic management elements need to operate in agreement to provide a holistic management of the entire computer system.

Accordingly, there is a need in the industry for the development of an improved computer system having two or more autonomic management elements, along with the methods for appropriate management of such a computer system, including multiple guest operating systems running on the computer system and their respective software applications.

SUMMARY OF THE INVENTION

Therefore there is an object of the present invention to provide an improved method and system for managing a computing system by using a hierarchy of autonomic management elements.

According to one aspect of the invention, there is provided a method for managing a computing system having hardware and software components, the method comprising the steps of:

(a1) launching two or more autonomic management elements, each running in a different component of the computing system;

(b1) negotiating a division of management responsibilities between the two or more autonomic management elements regarding selected components of the computing system; and (c1) managing said selected components of the computing system by the two or more autonomic management elements according to the division of management responsibilities.

The method further comprises the steps of:
(a2) arranging the hardware and software components of the computing system in a hierarchy of layers, comprising a lowest layer, a highest layer and one or more intermediate layers, the step being performed before the step (a1); and
wherein the step (a1) comprises configuring the autonomic management elements as masters or slaves depending on their respective positions in the hierarchy of layers, and running the autonomic management elements in a master-slave mode, wherein a master controls the management responsibilities of a slave.

The step (a1) further comprises:
(a3) configuring the autonomic management element running in the component occupying the lowest layer as the master for all other autonomic management elements;
(b3) configuring the autonomic management element running in the component occupying the highest layer as the slave for all other autonomic management elements; and
(c3) configuring the autonomic management element running in the component occupying the intermediate layer as the master for the autonomic management elements running in the components occupying layers above the intermediate layer, and as the slave for the autonomic management elements running in the components occupying layers below the intermediate layer.

The step (b1) further comprises the steps of:
(a4) determining a position of the layer in said hierarchy of layers occupied by the component in which the autonomic management element is running; and
(b4) executing any one or more of the following steps based on the position of the layer determined in the step (a4):
(b4i) negotiating the division of management responsibilities as the master for the autonomic management elements running in the components occupying layers above the layer occupied by the component in which the autonomic management element is running; and
(b4ii) negotiating the division of management responsibilities as the slave for the autonomic management elements running in the components occupying layers below the layer occupied by the component in which the autonomic management element is running.

The step (b4i) further comprises the steps of:
(a5) for an autonomic management element, listening for a connection request from the slave for the autonomic management element;
(b5) assuming the management responsibilities regarding the component in which the autonomic management element is running before the arrival of the connection request from the slave; and
(c5) communicating with the slave for the autonomic management element regarding the division of management responsibilities after the arrival of the connection request from the slave.

The step (b4ii) further comprises the steps of:
(a6) for an autonomic management element, sending a connection request to the master for the autonomic management element;
(b6) assuming the management responsibilities regarding the component in which the autonomic management element is running before the connection request sent in the step (a6) is satisfied;
(c6) communicating with the master for the autonomic management element regarding the division of management responsibilities after the connection request sent in step (a6) is satisfied; and
(d6) accepting the division of management responsibilities regarding the selected components sent by the master for the autonomic management element.

The step (c5) further comprises the step of exchanging information including a unique token identifying a connection with the slave, the step being performed after the step (b5).

The step (c6) further comprises the step of exchanging information including a unique token identifying a connection with the master, the step being performed after the step (b6).

According to another aspect of the invention, there is provided a method for managing a computing system having components, including a hardware platform, an operating system or a hypervisor, one or more guest operating systems and software applications, the method comprising the steps of:
(a9) arranging the components of the computing system in a hierarchy of layers, comprising a lowest layer, a highest layer and one or more intermediate layers;
(b9) launching autonomic management elements, each running in a different component of the computing system; configuring the autonomic management elements as masters or slaves depending on their respective positions in the hierarchy of layers, and running the autonomic management elements in a master-slave mode, wherein a master controls the management responsibilities of a slave;
(c9) negotiating a division of management responsibilities between the autonomic management elements regarding selected components of the computing system; and
(d9) managing said components of the computing system by the autonomic management elements according to the division of management responsibilities performed in step (c9).

The step (b9) further comprises the steps of:
(a10) configuring the autonomic management element running in the component occupying the lowest layer as the master for all other autonomic management elements;
(b10) configuring the autonomic management element running in the component occupying the highest layer as the slave for all other autonomic management elements; and
(c10) configuring the autonomic management element running in the component occupying the intermediate layer as the master for the autonomic management elements running in the components occupying layers above the intermediate layer and as the slave for the autonomic management elements running in the components occupying layers below the intermediate layer.

The step (c9) further comprises the steps of:
(a11) determining a position of the layer in said hierarchy of layers occupied by the component, in which the autonomic management element is running; and
(b11) executing any one or more of the following steps based on the position of the layer determined in the step (a11):
(b11i) negotiating the division of management responsibilities as the master for the autonomic management elements running in the components occupying layers above the layer occupied by the component, in which the autonomic management element is running; and
(b11ii) negotiating the division of management responsibilities as the slave for the autonomic management elements running in the components occupying layers below the layer occupied by the component in which the autonomic management element is running.

The step (b11i) further comprises:
(a12) for an autonomic management element, listening for a connection request from the slave for the autonomic management element;
(b12) assuming the management responsibilities regarding the component, in which the autonomic management element is running before the arrival of the connection request from the slave; and
(c12) communicating with the slave for the autonomic management element regarding the division of management responsibilities after the arrival of the connection request from the slave.

The step (b11ii) further comprises:
(a13) for an autonomic management element, sending a connection request to the master for the autonomic management element;
(b13) assuming the management responsibilities regarding the component, in which the autonomic management element is running before the connection request sent in the step (a13) is satisfied;
(c13) communicating with the master for the autonomic management element regarding the division of management responsibilities after the connection request sent in step (a13) is satisfied; and
(d13) accepting the division of management responsibilities regarding the selected components sent by the master for the autonomic management element.

According to yet another aspect of the invention, there is provided a method for managing a computing system having components including a hardware platform, a hypervisor, a guest operating system and an application, the method comprising the steps of:
(a14) arranging the components of the computing system in a hierarchy of layers, in which the hardware platform occupies a lowest layer, the hypervisor occupies a second layer, the guest operating system occupies a third layer and the application occupies a fourth layer;
(b14) launching three autonomic management elements, one running in the hardware platform, one running in the hypervisor and one running in the guest operating system; configuring the autonomic management elements as masters or slaves depending on their respective positions in the hierarchy of layers, and running the autonomic management elements in a master-slave mode, wherein a master controls the management responsibilities of a slave;

(c14) negotiating a division of management responsibilities between the three autonomic management elements regarding selected components of the computing system; and
(d14) managing said selected components of the computing system by the three autonomic management elements according to the division of management responsibilities.

The step (b14) further comprises the steps of:
(a15) configuring the autonomic management element running in the hardware platform as the master for all other autonomic management elements;
(b15) configuring the autonomic management element running in the guest operating system as the slave for all other autonomic management elements; and
(c15) configuring the autonomic management element running in the hypervisor as the master for the autonomic management element running in the guest operating system and as the slave for the autonomic management element running in the hardware platform.

The step (c14) further comprises the steps of:
(a16) determining a position of the layer in said hierarchy of layers occupied by the component, in which the autonomic management element is running; and
(b16) executing any one or more of the following steps based on the position of the layer determined in the step (a16):
(b16i) negotiating the division of management responsibilities as the master for the autonomic management elements running in the components occupying layers above the layer occupied by the component, in which the autonomic management element is running; and
(b16ii) negotiating the division of management responsibilities as the slave for the autonomic management elements running in the components occupying layers below the layer occupied by the component in which the autonomic management element is running.

According to one more aspect of the invention, there is provided method for managing a computing system having components including a hardware platform, a hypervisor, a guest operating system and an application, the method comprising the steps of:
(a17) arranging the components of the computing system in a hierarchy of layers, in which the hardware platform occupies a lowest layer, the hypervisor occupies a second layer, the guest operating system occupies a third layer and the application occupies a fourth layer;
(b17) launching two autonomic management elements, running in the hardware platform, and in the guest operating system; configuring the autonomic management elements as masters or slaves depending on their respective positions in the hierarchy of layers, and running the autonomic management elements in a master-slave mode, wherein a master controls the management responsibilities of a slave;
(c17) negotiating a division of management responsibilities between the two autonomic management elements regarding selected components of the computing system; and
(d17) managing said selected components of the computing system by the two autonomic management elements according to the division of management responsibilities.

The step (b17) further comprises the steps of:
(a18) configuring the autonomic management element running in the hardware platform as the master for the other autonomic management element; and
(b18) configuring the autonomic management element running in the guest operating system as the slave for the other autonomic management element.

The step (c17) further comprises the steps of:
(a19) determining a position of the layer in said hierarchy of layers occupied by the component, in which the autonomic management element is running; and
(b19) executing any one of the following steps based on the position of the layer determined in the step (a19):
(b19i) negotiating the division of management responsibilities as the master for the autonomic management element running in the guest operating system; and
(b19ii) negotiating the division of management responsibilities as the slave for the autonomic management element running in the hardware platform.

According to yet another aspect of the invention, there is provided a method for managing a computing system having components including a hardware platform, an operating system and an application, the method comprising the steps of:
(a20) arranging the components of the computing system in a hierarchy of layers, in which the hardware platform occupies a lowest layer, the operating system occupies a second layer, and the application occupies a third layer;
(b20) launching two autonomic management elements, running in the hardware platform, and in the operating system; configuring the autonomic management elements as masters or slaves depending on their respective positions in the hierarchy of layers, and running the autonomic management elements in a master-slave mode, wherein a master controls the management responsibilities of a slave;
(c20) negotiating a division of management responsibilities between the two autonomic management elements regarding selected components of the computing system; and
(d20) managing said selected components of the computing system by the two autonomic management elements according to the division of management responsibilities.

The step (b20) further comprises the steps of:
(a21) configuring the autonomic management element running in the hardware platform as the master for the other autonomic management element; and
(b21) configuring the autonomic management element running in the operating system as the slave for the other autonomic management element.

The step (c20) further comprises the steps of:
(a22) determining a position of the layer in said hierarchy of layers occupied by the component, in which the autonomic management element is running; and
(b22) executing any one of the following steps based on the position of the layer determined in the step (a22):
(b22i) negotiating the division of management responsibilities as the master for the autonomic management element running in the operating system; and
(b19ii) negotiating the division of management responsibilities as the slave for the autonomic management elements running in the hardware platform.

According to one more aspect of the invention, there is provided a system for managing a computing system having hardware and software components, comprising:
two or more autonomic management elements, each running in a different component of the computing system, and comprising a respective Embot™ Mediation Service module, negotiating a division of management responsibilities between the autonomic management elements for managing selected hardware and software components of the computing system.

According to yet one more aspect of the invention, there is provided a system for managing a computing system having hardware and software components arranged in a hierarchy of layers including a lowest layer, a highest layer and one or more intermediate layers, the system comprising:

two or more autonomic management elements, each running in a different component of the computing system, each autonomic management element comprising:

(a24) a Platform Mediation Service module determining a position of the layer in said hierarchy of layers occupied by the component in which the autonomic management element is running for configuring the autonomic management element as a master or slave depending on its respective position in the hierarchy of layers, and for running the autonomic management element in a master-slave mode, wherein a master controls the management responsibilities of a slave; and (b24) an Embot™ Mediation Service module negotiating a division of management responsibilities between the masters and slaves for managing selected components of the computing system.

In the system described above, the Embot™ Mediation Service module further comprises:

(a25) a Persistent Data Storage module storing information regarding the masters and the slaves;

(b25) an Auto-Discovery module connecting the slave to the master; and (c25) a Command Processor module processing commands from the master and the slave that communicate with each other.

Beneficially, the system further comprises:

(a26) a Communication Protocols module supporting communication between the master and the slave;

(b26) a Registration Service module controlling access to registration information including contact information for the slaves and masters for the autonomic management element;

(c26) a Configuration Service module providing resource configuration information including the location of the autonomic management elements; and (d26) a Delegation Service module providing information regarding the division of management responsibilities between the masters and slaves.

The system further comprises a Heartbeat Module maintaining a continuous communication between the master and the slave.

According to one more aspect of the invention, there is provided a system for managing a computing system having components including a hardware platform, a hypervisor, a guest operating system and an application, arranged in a hierarchy of layers, in which the hardware platform occupies a lowest layer, the hypervisor occupies a second layer, the guest operating system occupies a third layer and the application occupies a fourth layer, the system comprising:

three autonomic management elements, one running in the hardware platform, one running in the hypervisor and one running in the guest operating system; each autonomic management element comprising:

(a28) a Platform Mediation Service module determining a position of the layer in said hierarchy of layers occupied by the component in which the autonomic management element is running for configuring the autonomic management element as a master or slave depending on its respective position in the hierarchy of layers, and for running the autonomic management element in a master-slave mode, wherein a master controls the management responsibilities of a slave; and (b28) an Embot™ Mediation Service module negotiating a division of management responsibilities between the masters and slaves for managing selected components of the computing system.

The Embot™ Mediation Service module further comprises:

(a29) a Persistent Data Storage module storing information regarding the masters and the slaves;

(b29) an Auto-Discovery module connecting the slave to the master; and (c29) a Command Processor module processing commands from the master and the slave that communicate with each other.

The system further comprises:

(a30) a Communication Protocols module supporting communication between the master and the slave;

(b30) a Registration Service module controlling access to registration information including contact information for the slaves and masters for the autonomic management element;

(c30) a Configuration Service module providing resource configuration information including the location of the autonomic management elements; and (d30) a Delegation Service module providing information regarding the division of management responsibilities between the masters and slaves.

The system further comprises a Heartbeat Module maintaining a continuous communication between the master and the slave.

According to one more aspect of the invention, there is provided a system for managing a computing system having components including a hardware platform, a hypervisor, a guest operating system and an application, arranged in a hierarchy of layers, in which the hardware platform occupies a lowest layer, the hypervisor occupies a second layer, the guest operating system occupies a third layer and the application occupies a fourth layer, the system comprising:

two autonomic management elements, one running in the hardware platform, and one running in the guest operating system; each autonomic management element comprising:

(a32) a Platform Mediation Service module determining a position of the layer in said hierarchy of layers occupied by the component in which the autonomic management element is running for configuring the autonomic management element as a master or slave depending on its respective position in the hierarchy of layers, and for running the autonomic management element in a master-slave mode, wherein a master controls the management responsibilities of a slave; and (b32) an Embot™ Mediation Service module negotiating a division of management responsibilities between the masters and slaves for managing selected components of the computing system.

According to yet one more aspect of the invention, there is provided a system for managing a computing system having components including a hardware platform, an operating system and an application, arranged in a hierarchy of layers, in which the hardware platform occupies a lowest layer, the operating system occupies a second layer and the application occupies a third layer, the system comprising:

two autonomic management elements, one running in the hardware platform, and the other one running in the operating system; each autonomic management element comprising:

(a33) a Platform Mediation Service module determining a position of the layer in said hierarchy of layers occupied by the component in which the autonomic management element is running for configuring the autonomic management element as a master or slave depending on its respective position in the hierarchy of layers, and for running the autonomic management element in a master-slave mode, wherein a master controls the management responsibilities of a slave; and (b33) an Embot™ Mediation Service module negotiating a division of management responsibilities between the masters and slaves for managing selected components of the computing system.

A computer program product for managing a computing system having hardware and software components, comprising a computer readable medium having computer program code means embodied in said medium for causing said computer to perform the steps of the method described above is also provided.

BRIEF DESCRIPTION OF DRAWINGS

Further features and advantages of the invention will be apparent from the following description of the embodiment, which is described by way of example only and with reference to the accompanying drawings in which:

FIG. 3b illustrates the software architecture of the Embot™ Mediation Service of FIG. 3a;

DESCRIPTION OF THE EMBODIMENTS OF THE INVENTION

Figure 1:
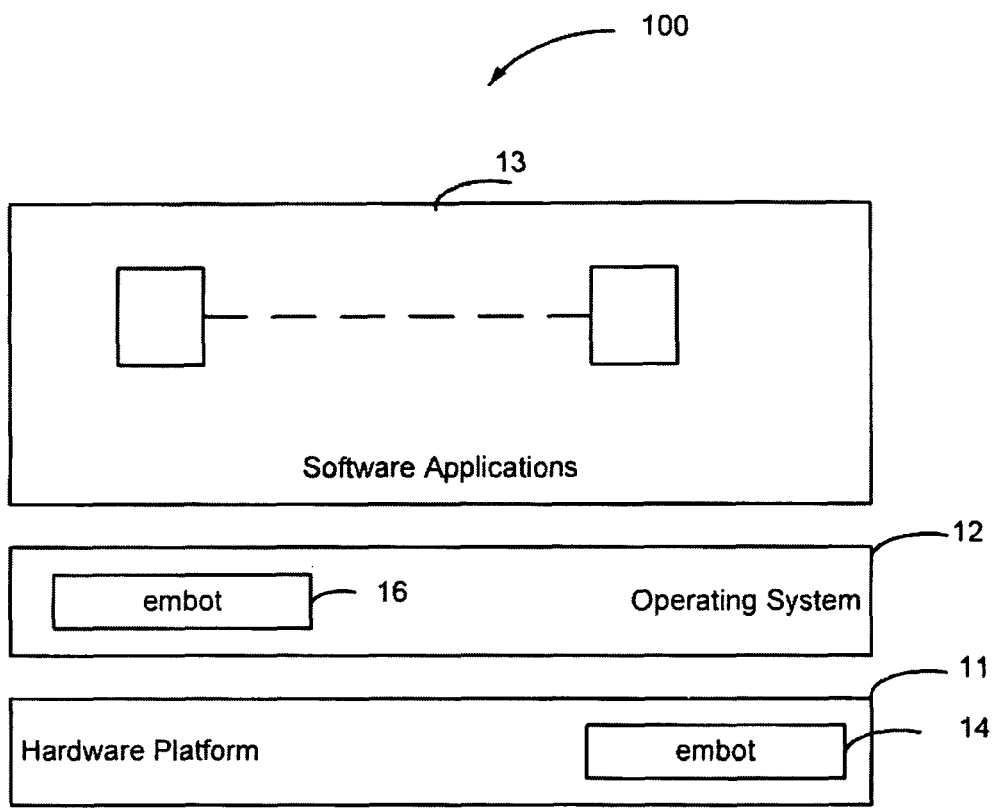
FIG. 1 illustrates a computer system according to the embodiment of the present invention having two autonomic management elements that are respectively placed in the hardware platform and within the operating system.

FIGS. 1 and 2 illustrate respective computer systems 100 and 200, having more than one autonomic management elements in accordance with the embodiments of the present invention.

FIG. 1 illustrates a computer system 100 including a hardware platform 11, an operating system 12 and a plurality of applications 13, running on top of the operating system 12. There are two autonomic management elements in the computer system 100. An autonomic management element 14 (Embot™) is placed within the hardware platform 11 and another autonomic management element 16 is placed (In-Band) within the operating system (Embot™ 16).

Figure 2A:
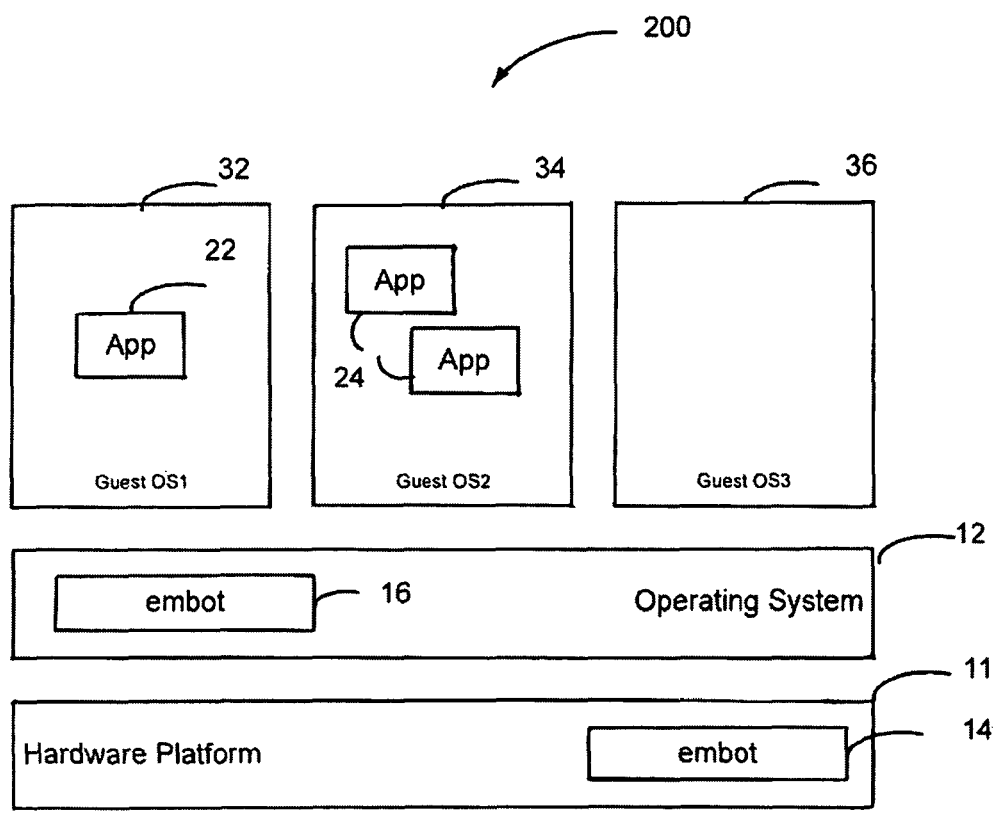
FIG. 2a illustrates a computer system according to another embodiment of the present invention where two autonomic management elements are respectively placed in the hardware platform and within the operating system.

FIG. 2a shows a computer system 200 with a virtualized environment that includes the hardware platform 11 and an operating system 12. Guest OS1 32, Guest OS2 34 and Guest OS3 36 represent additional virtualized operating systems (guest operating systems) that are running on top of the operating system 12. Guest OS1 32, Guest OS2 34 and Guest OS3 36 run their respective software applications labeled 22, 24 and 26 respectively. As in FIG. 1, an autonomic management element or Embot™ 14 is placed in the hardware platform. Another autonomic management element 16 is located within the operating system 12.

Figure 2B:
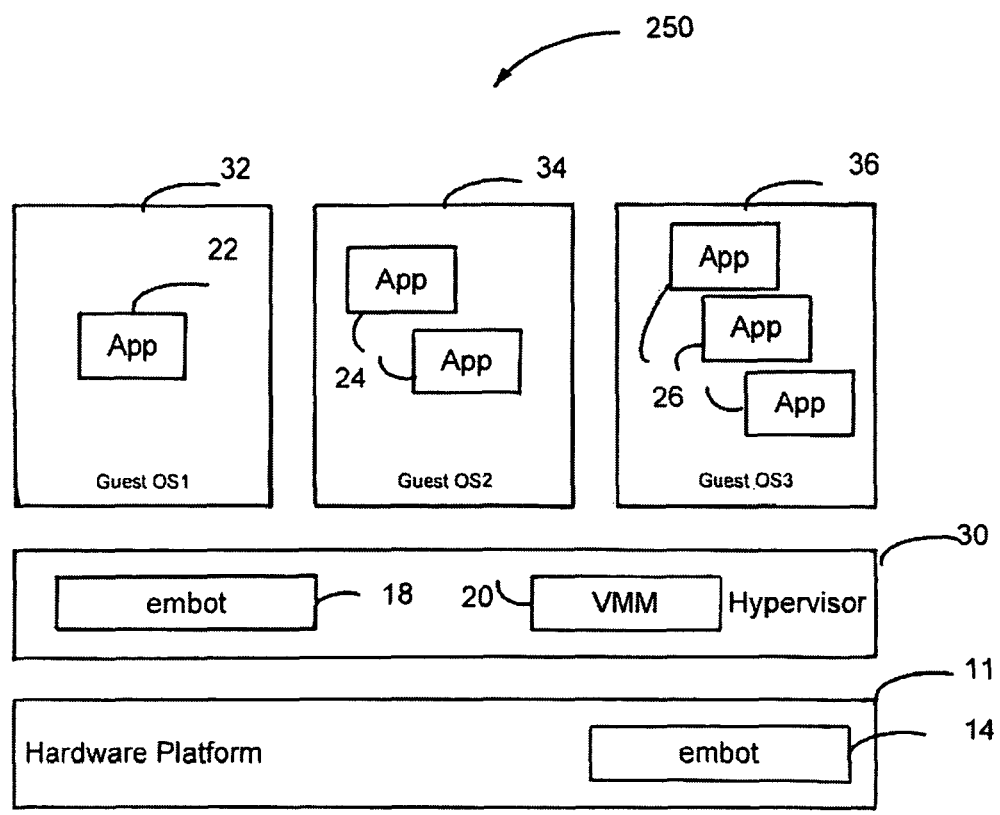
FIG. 2b illustrates a computer system according to another embodiment of the present invention where two autonomic management elements are respectively placed in the hardware platform and within the hypervisor.

FIG. 2b shows a computer system 250 in which the guest operating systems are running on top of a hypervisor 30 with its Virtual Machine Manager (VMM) 20. The hypervisor 30 replaces the operating system 12 of the computer system 200, where an autonomic management element 18 is placed within the hypervisor 30. All other components of the computer system 250 are the same as in the computer system 200 shown in FIG. 2a. Computer systems, such as the ones shown as 200 and 250, have a layered architecture and the hardware and software components of the computer system are organized in a hierarchy of layers. The hardware platform occupies the lowest layer whereas the operating system 12 or the hypervisor 30 occupies the next layer. The guest operating systems are located in the third layer whereas the applications lie in the fourth layer. Although the example computer systems 200 and 250 contain autonomic management elements at the first and the second layers, autonomic management elements can be placed at higher layers as well.

When the autonomic management element is placed at the lowest layer in the hardware platform 11 (e.g., autonomic management element 14 in FIGS. 2a and 2b), it has the advantage of surviving any catastrophic problems occurring in any of the above layers. This means the autonomic management element survives any problem within the operating system 12, and in any virtualized guest operating systems, such as Guest OS1 32 to Guest OS3 36 that are running on top of the operating system 12 and their respective applications 22, 24, 26. However, in this situation, the autonomic management element 14 has issues with available resources since hardware implementations typically have constricted resources, which makes it difficult for the autonomic management element 14 to handle the entire computer system, e.g., the entire computer system 200, having multiple guest operating systems and software applications, as the situation would be in a virtualized environment, which is illustrated in FIG. 2a.

In contrast, when the autonomic management element 16 of FIG. 1 is placed within the OS 12, it now has the advantage of significant resources made available to it, but is susceptible to any type of failure within the operating system including crashes, main power failures, user error, malware, etc.

With the advancements in virtualization, running in the hypervisor 30, shown in FIG. 2b, has all the benefits of resources, allowing the Embot™ 18 of FIG. 2b to manage multiple disparate guest operating systems and applications without suffering any of the OS problems in a specific virtualized guest OS. However, the Embot™ 18 relies on main power supplied by the hardware platform 11 and basic services provided by the operating system 12 or hypervisor 30, and therefore is still susceptible to problems, some of which are described in the previously filed patent application, cited above, and are related to the separation of management and service in a virtualized environment.

Once an autonomic management element is installed and running within a computer system, it needs to be aware of the potential for other autonomic management elements to co-exist. When another autonomic management element has been detected, the process of negotiation and dividing management responsibilities between the autonomic management elements begins.

Figure 3A:
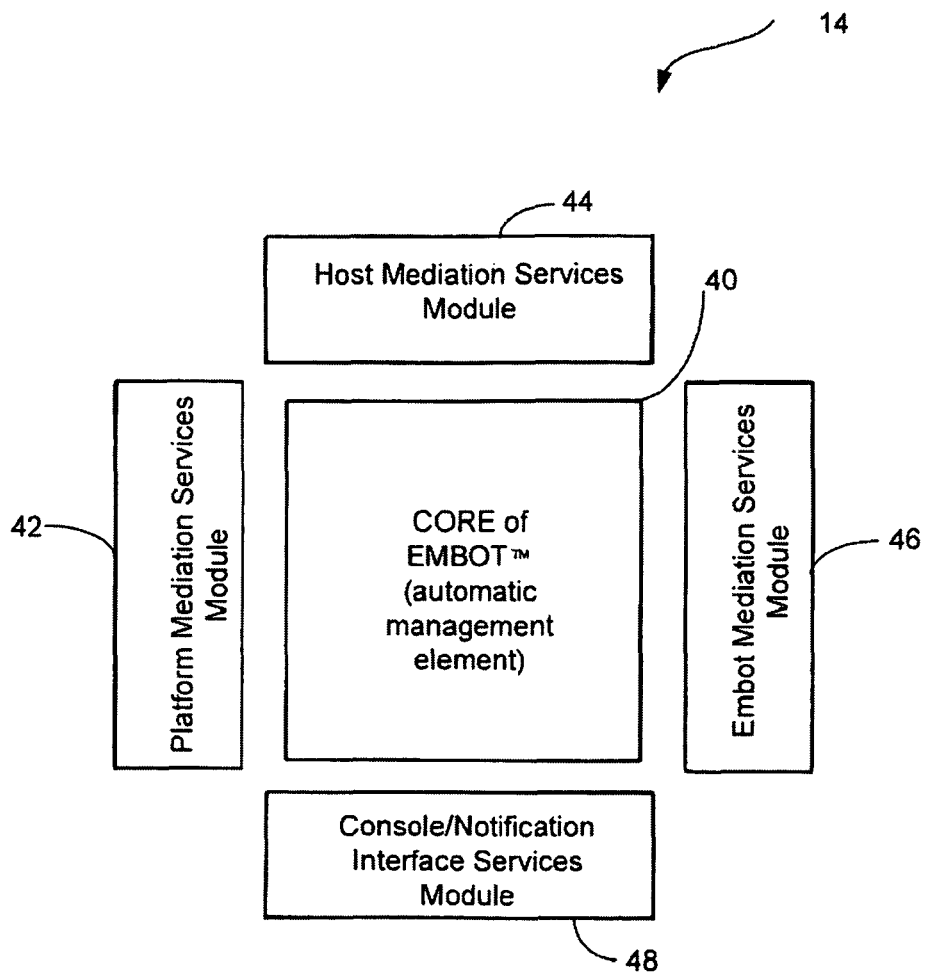
FIG. 3a illustrates a portion of the Service Oriented Framework (SOF) for the autonomic management element according to the embodiments of the present invention.

FIG. 3a illustrates a simplified structure of the autonomic management element 14, 16 or 18, which is a Service Oriented Framework (SOF) with a group of dynamically installed, configured and run services.

Surrounding the core 40 of the Embot™ is a series of "Mediation Services", which abstract direct calls to the components in which the Embot™ runs, e.g., the hardware platform 11, the operating system 12 or the hypervisor 30 that enables virtualization. Four primary modules of the Mediation Services are shown in FIG. 3a, namely Platform Mediation Services module 42, Host Mediation Services module 44, Embot™ Mediation Services module 46, and Console/Notification Services module 48.

Each of the Mediation Services modules 42, 44, 46 and 48 can dynamically load up code or services as needed from respective repositories, or request and download new code or services as required from an external console. Two of these modules, the Platform Mediation Services module 42 and the Embot™ Mediation Services module 46 are of interest for the present invention. The modules comprise a firmware, or alternatively, a computer software code stored in a computer readable medium such as a semiconductor memory, flash memory, Compact Disc (CD) or Digital Versatile Disc (DVD) to be executed by a processor.

The Console/Notification Interface Services module 48 provides communication to external consoles, and the Host Mediation Services module 44 provides an abstract interface to multiple operating systems as well as software applications that the autonomic management element 14 needs to manage.

The Platform Mediation Services module 42 provides an abstract interface to the component on which the autonomic management element is running. This service provides detection routines to independently determine the platform that the autonomic management element is running on, along with other information, code or services required for the autonomic management element 14 to operate fully.

The Embot™ Mediation Services module 46 provides an abstracted communications interface for interconnecting with other autonomic management elements within the computer system.

As described earlier, the computer system, comprising components that include a hardware platform 11, an operating system 12 or a hypervisor 30, and other guest operating systems including software applications, is characterized by a hierarchy of layers. Thus, a corresponding hierarchy of layers is formed for autonomic management elements, such that a layer of the computer system may have a corresponding autonomic management placed within the layer. The autonomic management elements operate on the layer in which they are installed and above.

According to the embodiments of the present invention, the autonomic management elements work in a master-slave fashion and each autonomic management element is configured to operate as a master or a slave with regard to another autonomic management element in the computer system through its Embot™ Mediation Services module 46. Each autonomic management element operates as a master with regard to the autonomic management elements that are running in the above layers, and operates as a slave with regard to the autonomic management elements that are running in the layers below. Clearly, the autonomic management element at the lowest layer operates as a master only due to the absence of any lower layer autonomic management element. Similarly, the autonomic management element at the highest layer operates as a slave only due to the absence of any higher layer autonomic management element. An autonomic management element in any intermediate layer operates both as a master and a slave. It is a master to the upper layer autonomic management elements and a slave to the lower layer autonomic management elements.

Figure 3B:
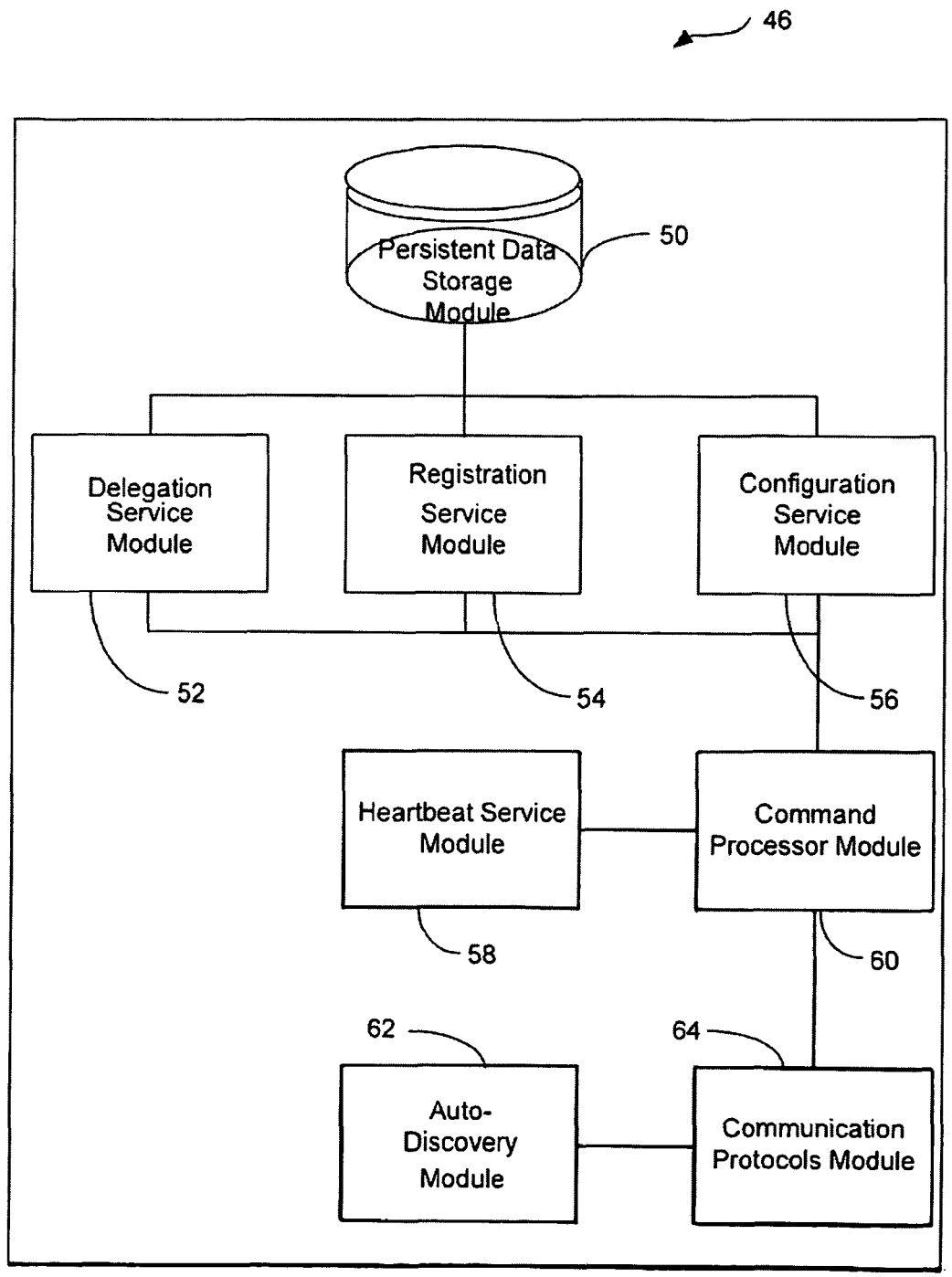

The software architecture for the Embot™ Mediation Service 46 is presented in FIG. 3b. The Embot™ Mediation Service includes a few basic modules: a Delegation Service module 52, a Registration Service module 54, a Configuration Service module 56, the Heartbeat Service module 58, the Command Processor Service module 60, the Communication Protocols module 64 and the Auto-Discovery module 62. A Persistent Data Storage module 50 is used for storing the data required for handling the autonomic management elements. The modules comprise a firmware, or alternatively, a computer software code, which is stored in a computer readable medium, such as a semiconductor memory, flash memory, CD or DVD. A brief description of each of these modules is presented next.

The Communication Protocols module 64 deals with connections between an Embot™ and anything else that it may attempt to connect; the preferred connection method is based on network protocols. This component contains all appropriate protocols when installed on its target. However, at times, the preferred connection method may not be available (e.g. the Embot™ in firmware may only have the ability to use Direct Memory Access (DMA) based memory transfers to communicate).

The Auto-Discovery module 62 is used by a slave Embot™ and assists in connecting a slave and master Embot™ together. The master awaits an incoming slave at a known location depending on the communication protocols that are available. The slave, depending on configuration, calls upon the Auto-Discovery module 62 to connect to a master.

The slave can be configured in many ways—this configuration is used by the Auto Discovery module 62 when it is called. The different possible configurations include the following.

Manual configuration: This allows the end-user to set a target master for a slave in advance, it is used mainly to get past communication issues that can occur in some edge cases.

Network-Based configuration: includes two types of network-based configurations that are discussed. One uses the Dynamic Host Configuration Protocol (DHCP) and the other is subnet-based.

DHCP-based: When retrieving an IP address for an Embot™, there may be a known value for the master stored as a custom option.

Subnet: The subnet is scanned for any IP address that has a known port open. This known port is an Internet Assigned Numbers Authority (IANA) registered known port.

DMA-based configuration: First contact is made to a known base memory address, after which data exchange may be over different addressing. This information is communicated within the information provided at the base memory address.

The Command Processor module 60 accepts commands from the slave/master at the other end of the connection. The commands include the following:

DiscoverMaster: Used by a slave to start auto discovery and create a connection with a master.

RegisterWithMaster: Allows a slave to register with the master. The slave provides the master with the following information:
the layer at which the slave is
which slaves this slave is a master of
current resource profile of this slave
current responsibilities: that include the responsibilities this slave (and slaves controlled by this slave as a master) are already managing.

The master determines the division of management responsibilities: what responsibilities it will allow the slave to manage and what responsibilities it will manage by itself. The master may use the following commands.

acceptSlave: The master returns the list of responsibilities delegated to the slave as well as information about its master (if one exists). This last piece of information is used in error conditions like lost heartbeat. A heartbeat message is sent out periodically when no other normal communication occurs between the master and the slave to ensure that these entities are active and running.

redirectSlave: The master may inform the slave to connect to a different master; this is used to correct previous error conditions like lost heartbeat.

DelegateTasks: Used by a master to tell a slave to accept new responsibilities or tasks when another slave or the master is no longer able to do them.

UpdateResources: Used to update a master or a slave with change in resource configuration information. This may force a RenegotiateResponsibilities if changes in resources/capabilities mean that a slave or master can no longer handle its responsibilities.

RenegotiateResponsibilities: Identical to register but presumes the slave is already in the Persistent Data Storage module 50.

RequestCurrentDelegatedTasks: Used by a master or its slave to ask for a current list of responsibilities or tasks that is assigned to the other.

RedirectSlaveToMaster: Used by a master to instruct a slave to reconnect to a different master. This is used to reconnect a slave to its proper master in an appropriate layer.

The Registration Service 54 module controls access to registration information stored within the Persistent Data Storage module 50. For a given autonomic management element, it keeps the last contact information on all slaves in the components located in the layers above it as well as the master in the layer below it (if available). This component is enabled on master only if/when a slave connects, the registration service is started.

The Configuration Service module 56 controls access to configuration information within the Persistent Data Storage module 50. It deals with the current resources, the current responsibilities and the current heartbeat timeout value, as it may need adjustment depending on the communication protocol in use and latency.

The Delegation Service module 52 controls access to responsibility information within the persistent data. It deals with:
  stack information—concerning layers that can potentially exist. For example:
    layer for the base hardware
      Embot™ may be in firmware
      Embot™ may be on adjunct hardware e.g. a PCI card or a USB key
    layer for the hypervisor
      Embot™ is in the privileged domain
    layer for the OS
      Embot™ may be within a single OS on base hardware
      Embot™ may be within a Guest OS within the hypervisor or some virtualization software
  Information on layers that currently exist: marks which layers are active and require management.
  current responsibilities: tracks currently registered/live slaves and the components they are managing.

The Heartbeat Service module 58 deals with ensuring a continuous connection between a master and its slaves. At both the master and the slave side of a connection, it sends messages out at regular intervals (as long as no other type of message is sent). Any non-heartbeat message between a slave and its master updates the heartbeats' last contact information and resets the heartbeat timeout. If a heartbeat is lost (diagnosed when a series of heartbeat messages are not being received during a given timeout period), an event returns to the command processor to correct the situation (depending on master or slave). In the case of a slave, the following operations are performed:

An attempt to reconnect to the last master as well as its master's master (if that information was provided during RegisterWithMaster) is made until it reconnects to any master. If the slave connects, the new master is now the slave's master, the slave updates its information, discarding what it knew about a previous master. It will reconnect to its old master if its new master sends a RedirectSlaveToMaster command.

Takes over the master's responsibilities, when possible, after a predetermined timeout, and records/reports the current situation.

In the case of a master, it will remove the slave from registration, and if necessary, assume the responsibilities of the slave or delegate these responsibilities to another more capable slave if possible.

The operation of the autonomic management elements are described in more detail with regard to FIG. 4 to FIG. 7, which are presented next.

Figure 4:
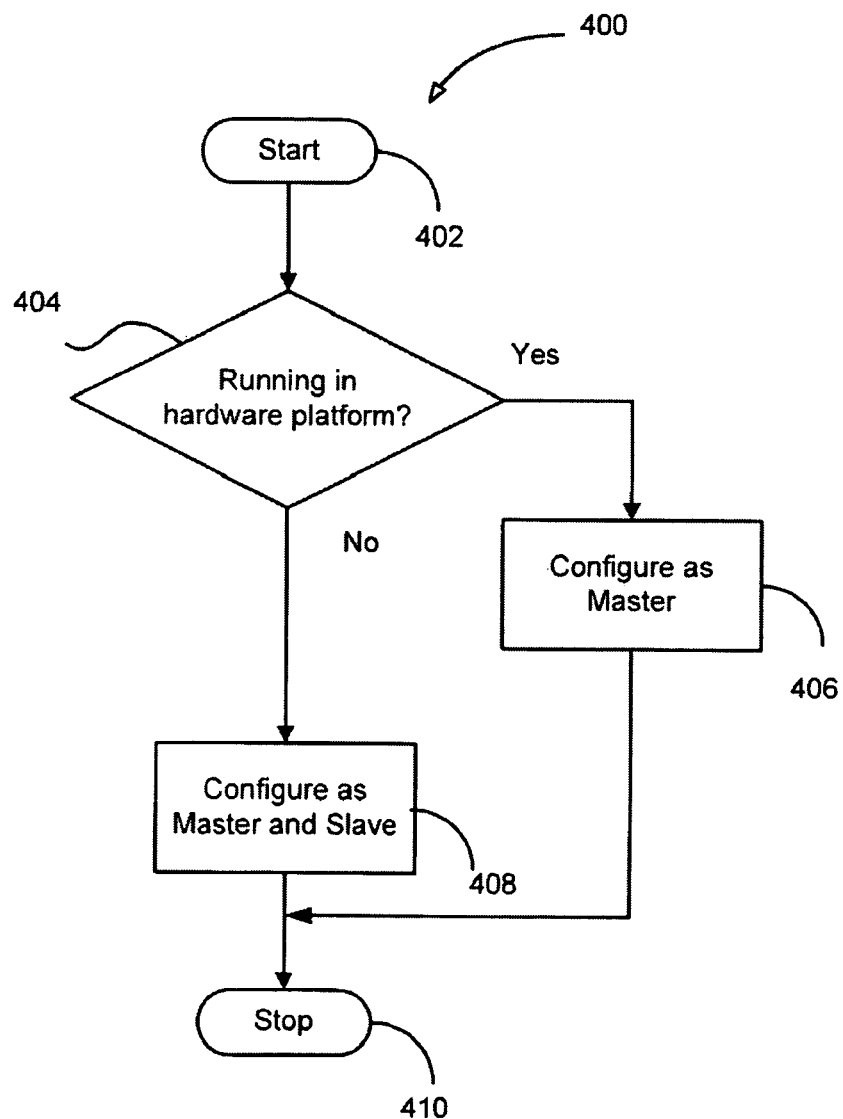
FIG. 4 illustrates the steps performed by an autonomic management element to configure itself as a master/slave.

Flowchart 400, shown in FIG. 4, illustrates the steps executed by an autonomic management element to determine at which layer it is running so that it can appropriately configure itself as a master and/or a slave. Upon start (box 402), the procedure 400 checks whether or not it is running in the hardware platform that is situated in the lowest layer of the hierarchy of components (box 404). If it is running in the lowest layer, the procedure 400 exits "Yes" from box 404, and configures the autonomic management element as a master (box 406) and exits (box 410). If the autonomic management element is running in a higher layer, the procedure 400 exits "No" from box 404, and configures the autonomic management element both as a master and as a slave (box 408) and exits (box 410). An autonomic management element in an intermediate layer serves as a master for upper layer autonomic management elements and as a slave for lower layer autonomic management elements. Please note that an autonomic management element in the highest layer of the hierarchy is a special case and has no slave autonomic element to manage. However, it serves as a slave for lower layer autonomic management elements. Although it is configured both as a master and a slave, its role as a master never gets activated by an incoming slave and it plays the role of a slave only. This is discussed further in a later paragraph.

Figure 5:
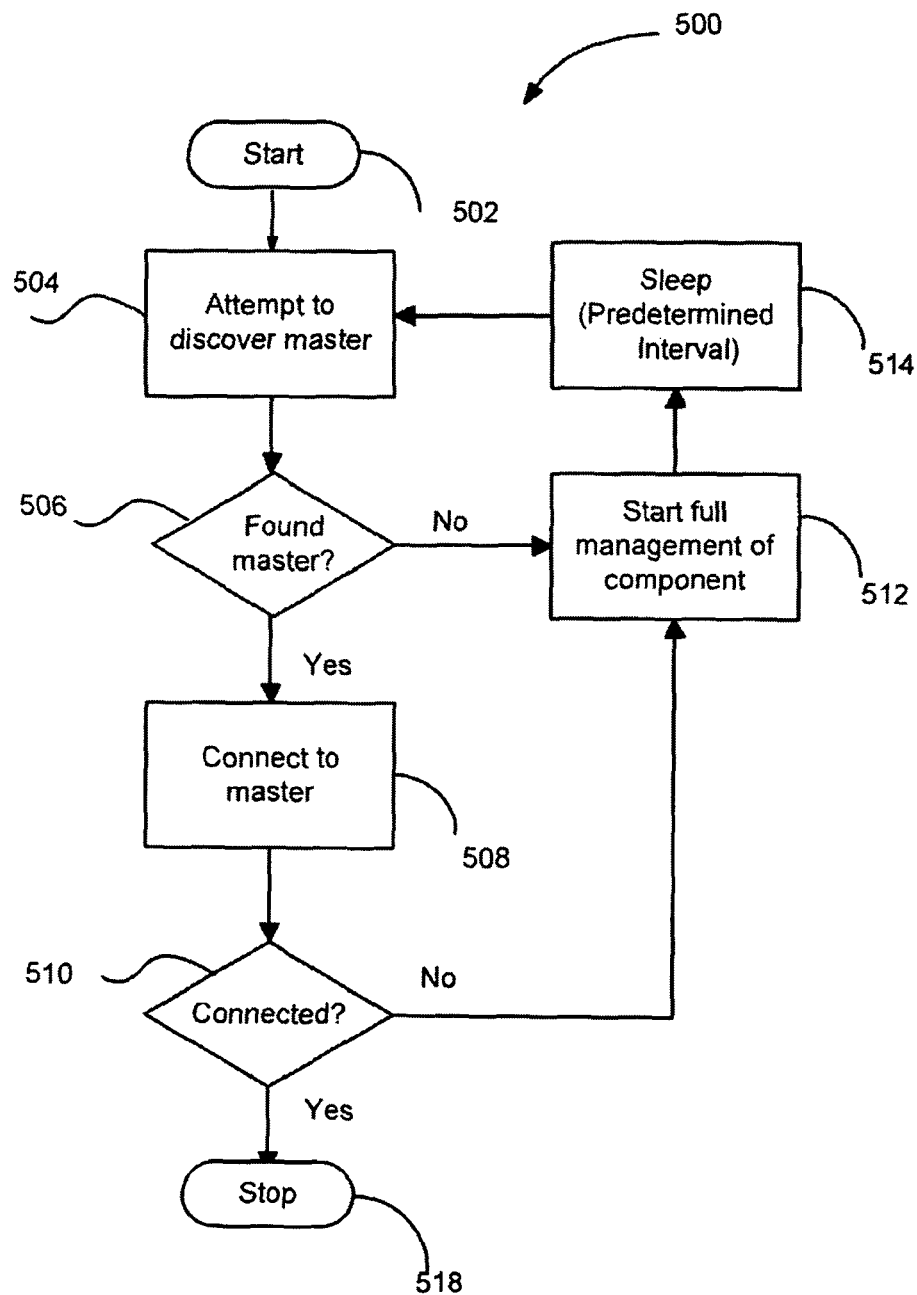
FIG. 5 illustrates the steps performed by an autonomic management element operating as a slave.

Flowchart 500 shown in FIG. 5 illustrates the steps executed by an autonomic management element after it is configured as a slave for assuming the role of the slave. Upon start (box 502), the procedure 500 attempts to discover a master autonomic management element (box 504). The autonomic management element that serves as the master lies in a layer that is located in a layer that is lower than the layer in which the slave autonomic management element is located. The procedure 500 then checks whether or not a master was found (box 506). If found, it exits "Yes" from box 506 and goes to connect with the master (box 508). Otherwise, it exits "No" from box 506, and if it is already not managing the component in which it is running, it assumes the management responsibilities for this component and starts full management of the component (box 512). Then the procedure 500 sleeps for a predetermined interval of time (box 514) and goes to the entry of box 504 for trying to discover the master. After exiting from box 508, the procedure 500 checks whether it was able to connect to the master (box 510). If successfully connected it exits (box 518). Otherwise, it goes to the entry of box 512 for managing the component in which it is running.

Figure 6:
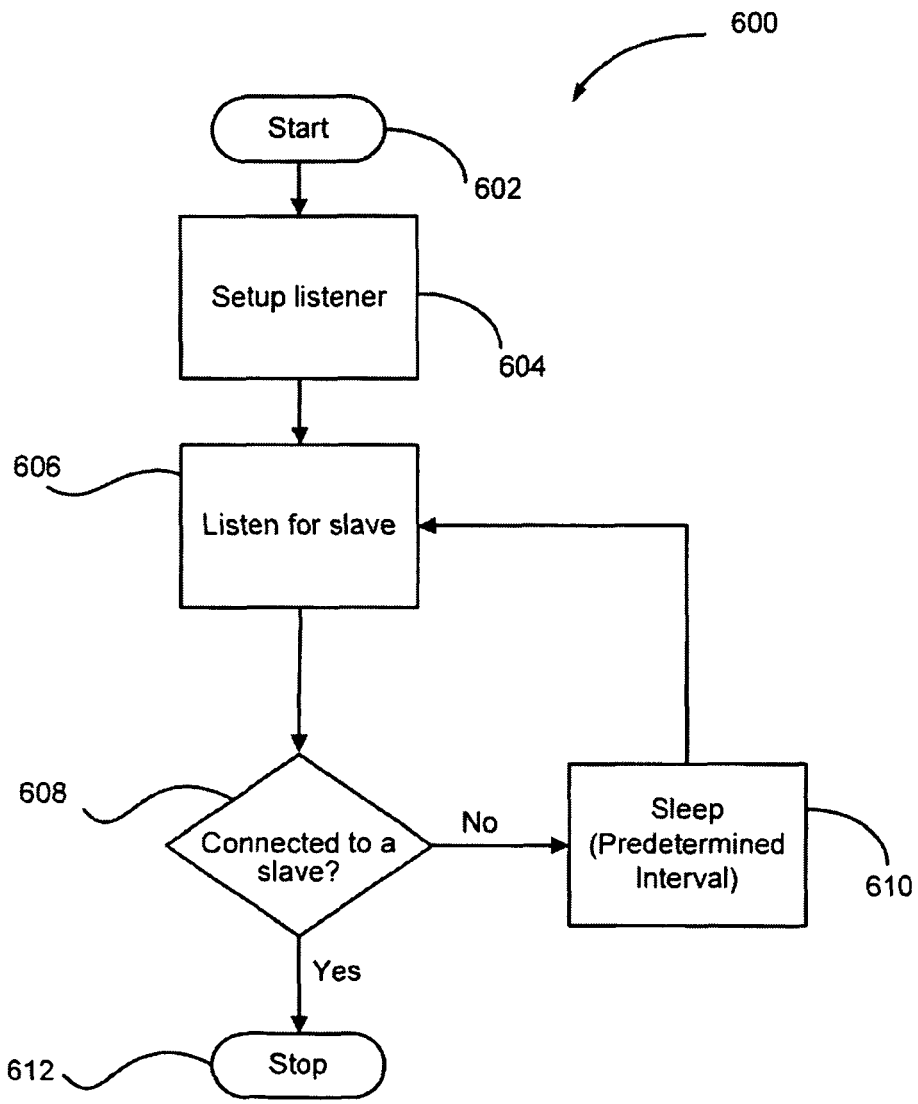
FIG. 6 illustrates the steps performed by an autonomic management element operating as a master.

Flowchart 600 shown in FIG. 6 illustrates the steps executed by an autonomic management element after it is configured as a master for assuming the role of the master. Upon start (box 602), the procedure 600 sets up a listener for listening to a connection request from a slave (box 604). It then starts listening for a request to arrive from a slave (box 606). Whether or not a connection with the slave is established is checked next (box 608). If successfully connected with the slave, the procedure 600 exits (box 612). Otherwise, it sleeps for a predetermined interval of time (box 610) and goes to the entry of box 606 to listen for a request to arrive from the slave. Before a connection with the slave is established the master assumes the management responsibilities for the component in which it is running and starts full management of the component. Please note that when an autonomic management element is running in the highest layer executes the steps of the procedure 600, it never receives a request from a slave, and thus never operates as a master.

Figure 7:
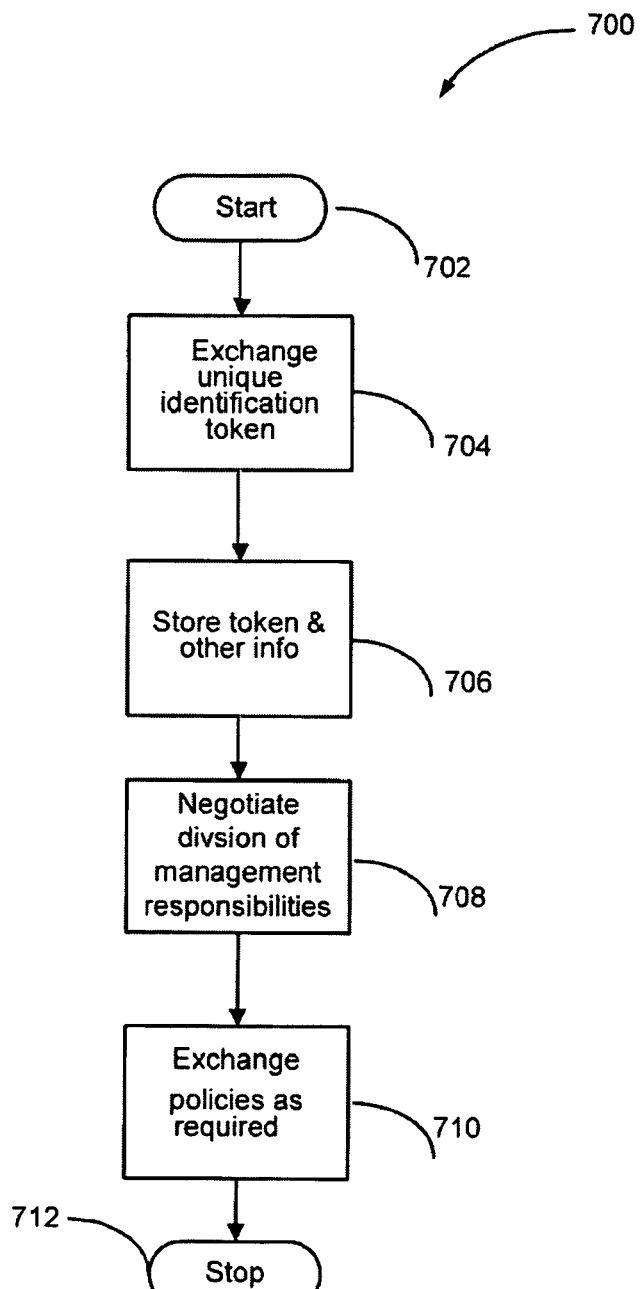
FIG. 7 illustrates the steps performed by a master and a slave after a successful connection has been established.

Flowchart 700, shown in FIG. 7, illustrates the steps performed by a master and a slave autonomic management element after a successful connection has been established between the two. Upon start (box 702), the procedure 700 performs an exchange of an identification token that uniquely identifies this connection with the other autonomic management element (box 704). The token and information regarding this connection is then stored (box 706). This information is useful for auto-reconnects at future restarts. Basic resource information is exchanged and the division of management responsibilities is negotiated (box 708). The procedure 700 then performs the exchange of policy information as required (box 710) and exits (box 712). Policies, in this context, are the instructions in which an Embot™ will enforce on a particular component. These policies are described in more detail in previous patent documentation.

Autonomic management elements can run in various layers of the hierarchy of layers. If an autonomic management element is running at the highest layer, it runs as a slave and executes the steps of the procedure 500 outlined in FIG. 5. Similarly, an autonomic management element running in the lowest layer runs as a master and executes the steps of the procedure 600 presented in FIG. 6. An autonomic management element running in an intermediate layer is configured both as a master and a slave and executes the steps of both the procedures captured in the flow charts shown in FIGS. 5 and 6. A description of how the hierarchy of autonomic management elements handles a number of specific situations is presented next.

Restart Procedure

The behavior of the hierarchy of autonomic management elements when the system restarts after a failure is described. On a restart, the master tries to manage the system up to the point that it negotiated away in a previous session and starts that responsibility right away. The master waits for a brief time interval at startup to reconnect with slaves it has connected to in the past, in case the slave does not return after a restart. If a connection with the slaves is not made, the master marks the slaves as being in a questionable state, assumes their duties and takes over management on the slaves' behalf.

If the slave reconnects sometime in the future, negotiation will occur as if this was a first contact situation.

On a restart, a slave immediately attempts to connect to the known master rather than starting a new auto-discovery.

If the slave is unable to connect to the known master within a predetermined time interval, the slave attempts to contact the master of its master (if known—this was exchanged during "acceptSlave"), otherwise, it returns to auto-discovery mode and attempts to find another master. This is important for situations where the master autonomic management element, running in the hardware platform 11, fails to come up after restart.

Placement of an Autonomic Management Element within a Hypervisor 30

When the autonomic management element determines that it is running within a hypervisor, it configures itself as both master and slave. The slave immediately attempts to find the autonomic management element in the hardware platform 11 corresponding to the lowest layer of the hierarchy of layers. If located, they exchange a unique identification token with each other and store communications information as described earlier in FIG. 7 so that they can auto-reconnect at future restarts as a master/slave pair. At the same time, the master goes into a listening mode waiting for other autonomic management elements from the guest operating systems to request for connections.

Thus, an autonomic management element in each layer understands its position in the hierarchy of layers as well as the role it is playing. All autonomic management elements running within guest operating systems naturally seek out the autonomic management element running within the hypervisor 30, located in the adjacent lower layer first, rather than the autonomic management element running within the hardware platform 11, located in the lowest layer of the hierarchy of layers. By establishing the hierarchy of layers of autonomic management elements early on, it simplifies the delegation of responsibilities between various autonomic management elements, and also simplifies handling error conditions, i.e. if one autonomic management element stops running, then an autonomic management element of another layer takes over responsibility.

Master/Slave Interactions and the Negotiation of Responsibility

The process of negotiating the division of management responsibilities regarding selected components of the computing system is discussed. The master controls this process and makes its determinations based on a number of items passed in by the slave. The simplest decisions are made around resources. If the autonomic management element is running in the hardware platform 11, it will more likely delegate all management responsibilities excluding platform management and the lowest layers of management to the slave running in the layer above. Examples of responsibilities delegated to the slave include monitoring OS 12 start/stop/restart or similar elements for a hypervisor 30. If the autonomic management element is running within a hypervisor, it will naturally take care of managing the hypervisor 30 as well as the lowest levels of each of the virtualized guest OSs. A similar operation is performed when the guest OS is run on top of an OS 12 (instead of a hypervisor).

Two specific examples that involve the negotiation and delegation of responsibilities between autonomic management elements of various layers are presented next.

Example 1

Negotiations Between Master Running in the Hardware Platform 11 and an Incoming Slave at any Layer 1. The master running within the hardware platform starts up and immediately manages at least the component it resides within as well as the OS 12 or the hypervisor 30 above it, which ever is present. It will also continue managing previous layers/components of the computer system it had managed before. For example, the master may not have been contacted by a slave in the past, and therefore was managing the entire computer system.
2. If a slave connects, the slave informs the master which policies the slave is currently managing (if any) as well as at what layer the slave is working. If this layer is in between the two already managing layers, then the division of management responsibilities are automatically renegotiated starting at the bottom layer.
3. The master initiates the division of management responsibilities and forms a policy list by combining the slave policy list to its own policy list and removing duplicates. Based on the updated policy list, the master instructs the slave which policies to stop managing.
4. Each layer of the computer system provides information regarding other layers it is communicating with. This information is necessary to effectively handle failures of components at any layer.
5. If the master is communicating with an existing slave, which resides in the higher layer that is below the layer in which the incoming slave is residing, the master sends information to the existing slave to communicate with the incoming slave as its master. This will cause the above layer to start a new negotiation as a master with each slave that connects to it.
6. Each layer remembers its current state for use in the next startup cycle.

Example 2

Master Running within the Hardware Platform 11 is Connected to an Autonomic Management Element Running within a Hypervisor 30, and the Autonomic Management Element within the Hypervisor 30 Stops In this example, one or more guest OSs are running on top of the hypervisor 30. Thus, the autonomic management element running within the hypervisor 30 is a slave for the autonomic management element running within the hardware platform 11 and a master for the autonomic management element running within any guest OS.

Let us assume the following.
1. Let us assume that, while all layers of the computer system are running, and management is occurring at each layer as per Example 1 described above, the autonomic management element within the hypervisor 30 fails, e.g., due to fault or some other issue.
2. All higher layer slaves, upon detecting the loss of their master, immediately try to connect to their previous masters as the autonomic element running within the hypervisor 30 may be restarting. While this activity continues, the higher layer slaves continue to manage items and applications of the computer system they have already been managing. After a predetermined timeout period, each slave will connect to the master of the autonomic management element within the hypervisor 30 as indicated during negotiation. If this information is not available, each slave will attempt to look for another master.
3. The lower level master, upon detecting the loss of a slave, immediately takes over responsibility of the layer above.
4. As each slave connects to the new master, they proceed as described in Example 1 above.
5. Each layer remembers its current state for use in the next startup cycle.

In more advanced cases, these boundaries of responsibilities may be blurred, and decisions may be made on application priorities, e.g., to preserve resources for a particular software application. Alternatively, the separation of management responsibilities between various level autonomic management elements may be manually configured, which is especially important if resources of a particular computer system are limited, and the end-user will need to decide what management policies should be run on the computer system. Various other modifications may be provided as needed. It is therefore to be understood that within the scope of the given system characteristics, the invention may be practiced otherwise than as specifically described herein.

A computer readable medium, such as CD, DVD, non-volatile memory, or the like, comprising computer code instructions stored thereon, which when executed by a computer, perform the steps of the methods described above is also provided.

The computer system of the embodiments of the invention comprises a computer having a processor and a memory, storing computer code instructions, which, when executed, perform the steps of the methods described above. Subsets of the computer code instructions stored in the memory form respective modules and means of the computer system, which provide corresponding functionality for the system as described in detail in the section "detailed description of the embodiments of the invention" above.

Although the embodiment of the invention has been described in detail, it will be apparent to one skilled in the art that variations and modifications to the embodiment may be made within the scope of the following claims.

What is claimed is:
1. A method for managing a computer having hardware and software components, comprising:
   arranging the hardware and software components of the computer in a hierarchy of layers;
   launching two autonomic management elements, each running in a different component of the computer;
   configuring the two autonomic management elements as a master and a slave, the master controlling management responsibilities of the slave, provided the two autonomic management elements are running in different layers;
   launching, by the slave, an automatic discovery procedure, based on a communication protocol, to discover and communicate with the master;
   upon successful automatic discovery procedure, registering the slave with the master, comprising reporting:
      a layer where the slave is located;
      other slaves for which the slave is a master;
      current resource profile of the slave; and
      current management responsibilities of the slave and the other slaves; and
   managing the hardware and software components of the computer by the two autonomic management elements, comprising running the two autonomic management elements in a master-slave mode.
2. The method of claim 1, further comprising, upon successful automatic discovery procedure:
   accepting the slave by the master; and
   delegating selected management tasks from the master to the slave.
3. The method of claim 2, further comprising, upon successful automatic discovery procedure:
   redirecting the slave to another master; or
   re-negotiating management responsibilities between the master and the slave.
4. The method of claim 1, wherein the configuring comprises configuring the two autonomic elements according to one or more of the following:

manual configuration;
network-based configuration; or
direct memory access configuration.

5. The method of claim 1, wherein the launching the automatic discovery procedure further comprises:
by the master, listening for a connection request from the slave; and
upon arrival of the connection request, communicating with the slave regarding a division of the management responsibilities between the master and the slave.

6. The method of claim 1, wherein the launching the automatic discovery procedure further comprises:
by the slave, sending a connection request to the master; and
upon confirmation of the connection request, communicating with the master regarding a division of the management responsibilities between the master and the slave.

7. The method of claim 1, wherein:
the arranging further comprises arranging the hardware components in the lowest layer; and
the configuring further comprises configuring an autonomic management element occupying the lowest layer as the master for the other autonomic management element.

8. The method of claim 1, wherein the configuring further comprises configuring an autonomic management element occupying the highest layer as the slave for the other autonomic management element.

9. The method of claim 1, wherein:
the arranging comprises forming a lowest layer, a highest layer and an intermediate layer; and
the configuring further comprises configuring an autonomic management element occupying the intermediate layer:
as the master for the other autonomic element provided the other autonomic management element occupies a layer above the intermediate layer; and
as the slave for the other autonomic element provided the other autonomic management element occupies a layer below the intermediate layer.

10. A system for managing a computer having hardware and software components, comprising:
a processor;
a non-transitory computer readable storage medium having computer readable instructions stored therein for execution by the processor, causing the processor to:
arrange the hardware and software components of the computer in a hierarchy of layers;
launch two autonomic management elements, each running in a different component of the computer;
configure the two autonomic management elements as a master and a slave, the master controlling management responsibilities of the slave, provided the two autonomic management elements are running in different layers;
launch, by the slave, an automatic discovery procedure, based on a communication protocol, to discover and communicate with the master;
upon successful automatic discovery procedure, register the slave with the master, comprising reporting:
a layer where the slave is located;
other slaves for which the slave is a master;
current resource profile of the slave; and
current management responsibilities of the slave and the other slaves; and
manage the hardware and software components of the computer by the two autonomic management elements, comprising running the two autonomic management elements in a master-slave mode.

11. The system of claim 10, wherein the computer readable instructions further cause the processor, upon successful automatic discovery procedure, to:
accept the slave by the master; and
delegate selected management tasks from the master to the slave.

12. The system of claim 11, wherein the computer readable instructions further cause the processor, upon successful automatic discovery procedure, to:
redirect the slave to another master; or
re-negotiate management responsibilities between the master and the slave.

13. The system of claim 10, wherein the computer readable instructions further cause the processor to configure the two autonomic elements according to one or more of the following:
manual configuration;
network-based configuration; or
direct memory access configuration.

14. The system of claim 10, wherein the computer readable instructions further cause the processor:
by the master, to listen for a connection request from the slave; and
upon arrival of the connection request, to communicate with the slave regarding a division of the management responsibilities between the master and the slave.

15. The system of claim 10, wherein the computer readable instructions further cause the processor:
by the slave, to send a connection request to the master; and
upon confirmation of the connection request, to communicate with the master regarding a division of the management responsibilities between the master and the slave.

16. The system of claim 10, wherein the computer readable instructions further cause the processor to:
arrange the hardware components in the lowest layer; and
configure an autonomic management element occupying the lowest layer as the master for the other autonomic management element.

17. The system of claim 10, wherein the computer readable instructions further cause the processor to configure an autonomic management element occupying the highest layer as the slave for the other autonomic management element.

18. The system of claim 10, wherein the computer readable instructions further cause the processor to:
form a lowest layer, a highest layer and an intermediate layer; and
configure an autonomic management element occupying the intermediate layer:
as the master for the other autonomic element provided the other autonomic management element occupies a layer above the intermediate layer; and
as the slave for the other autonomic element provided the other autonomic management element occupies a layer below the intermediate layer.

19. A method for managing a computer having hardware and software components, comprising:
arranging the hardware and software components of the computer in a hierarchy of layers;
launching two autonomic management elements, each running in a different component of the computer;
configuring the two autonomic management elements as a master and a slave, the master controlling management responsibilities of the slave, provided the two autonomic management elements are running in different layers;

launching, by the slave, an automatic discovery procedure, based on a communication protocol, to discover and communicate with the master;
upon successful automatic discovery procedure:
   accepting the slave by the master;
   delegating selected management tasks from the master to the slave;
   redirecting the slave to another master or re-negotiating management
   responsibilities between the master and the slave; and
managing the hardware and software components of the computer by the two autonomic management elements, comprising running the two autonomic management elements in a master-slave mode.

20. The method of claim 10, further comprising:
upon successful automatic discovery procedure, registering the slave with the master, comprising reporting:
   a layer where the slave is located; and
   other slaves for which the slave is a master.

21. The method of claim 19, further comprising:
upon successful automatic discovery procedure, registering the slave with the master, comprising reporting:
   current resource profile of the slave; and
   current management responsibilities of the slave.

22. A system for managing a computer having hardware and software components, comprising:
a processor;
a non-transitory computer readable storage medium having computer readable instructions stored therein for execution by the processor, causing the processor to:
   arrange the hardware and software components of the computer in a hierarchy of layers;
   launch two autonomic management elements, each running in a different component of the computer;
   configure the two autonomic management elements as a master and a slave, the master controlling management responsibilities of the slave, provided the two autonomic management elements are running in different layers;
   launch, by the slave, an automatic discovery procedure, based on a communication protocol, to discover and communicate with the master;
   upon successful automatic discovery procedure:
      accept the slave by the master;
      delegate selected management tasks from the master to the slave;
      redirect the slave to another master or re-negotiate management
      responsibilities between the master and the slave; and
   manage the hardware and software components of the computer by the two autonomic management elements, comprising running the two autonomic management elements in a master-slave mode.

23. The system of claim 22, wherein the computer readable instructions further cause the processor:
upon successful automatic discovery procedure, to report to the master a layer where the slave is located, and other slaves for which the slave is a master.

24. The system of claim 22, wherein the computer readable instructions further cause the processor to report a current resource profile of the slave, and current management responsibilities of the slave.

* * * * *

UNITED STATES PATENT AND TRADEMARK OFFICE
CERTIFICATE OF CORRECTION

| | | |
|---|---|---|
| PATENT NO. | : 9,038,069 B2 | Page 1 of 1 |
| APPLICATION NO. | : 14/477179 | |
| DATED | : May 19, 2015 | |
| INVENTOR(S) | : Jean-Marc Seguin et al. | |

It is certified that error appears in the above-identified patent and that said Letters Patent is hereby corrected as shown below:

In the Claims,

Column 21, line 9, Claim 19, the line break between the words "management" and "responsibilities" should be removed as it is one sentence.

Column 22, line 17, Claim 22, the line break between the words "management" and "responsibilities" should be removed as it is one sentence.

Signed and Sealed this
Third Day of November, 2015

Michelle K. Lee
*Director of the United States Patent and Trademark Office*